United States Patent [19]

Campbell et al.

[11] Patent Number: 5,973,074
[45] Date of Patent: Oct. 26, 1999

[54] TRANSPARENT THERMOPLASTIC COMPOSITION

[75] Inventors: Joseph O. Campbell, Springfield, Mass.; Eric K. Yeh, Troy, N.Y.; Russell P. Wong, Amherst; Paul J. Drenzek, Ware, both of Mass.

[73] Assignee: Bayer Corporation, Pittsburgh, Pa.

[21] Appl. No.: 09/145,880

[22] Filed: Sep. 2, 1998

[51] Int. Cl.⁶ .................................................. C08G 18/02
[52] U.S. Cl. ........................................ 525/125; 525/123
[58] Field of Search ................................ 525/125, 123

[56] References Cited

U.S. PATENT DOCUMENTS

| | | | |
|---|---|---|---|
| 3,049,505 | 8/1962 | Grabowski | 260/45.4 |
| 4,179,479 | 12/1979 | Carter, Jr. | 525/66 |
| 4,251,642 | 2/1981 | Tan et al. | 525/66 |
| 4,317,890 | 3/1982 | Goyert et al. | 525/66 |
| 4,342,847 | 8/1982 | Goyert et al. | 525/66 |
| 5,194,494 | 3/1993 | Henton et al. | 525/66 |
| 5,216,062 | 6/1993 | Lausberg et al. | 524/404 |
| 5,614,589 | 3/1997 | Niznik et al. | 525/71 |

OTHER PUBLICATIONS

Zerjal et al (Structure–Property Relationships in Polyurethane–Poly (styrene–co–acrylonitrile) Blends), Journal of Applied Polymer Science, vol. 50, pp. 719–729 (month unavailiable) 1993.

*Primary Examiner*—Rachel Gorr
*Attorney, Agent, or Firm*—Joseph C. Gil; Aron Preis

[57] ABSTRACT

A thermoplastic molding composition having a light transmission value of at least 40% is disclosed. The composition contains a thermoplastic polyurethane component, a styrene copolymer, and an alkyl(meth)acrylate component and is characterized by the compatibility of its components. The weight ratio between the styrene copolymer to the sum of the styrene copolymer and alkyl(meth)acrylate components was found to be critical to the light transmission of the inventive composition.

10 Claims, No Drawings

TRANSPARENT THERMOPLASTIC COMPOSITION

FIELD OF THE INVENTION

The present invention relates to thermoplastic molding compositions and more particularly to transparent compositions containing thermoplastic polyurethane.

SUMMARY OF THE INVENTION

A thermoplastic molding composition having a light transmission value of at least 40% is disclosed. The composition contains a thermoplastic polyurethane component, a styrene copolymer, and an alkyl (meth)acrylate component and is characterized by the compatibility of its components. The weight ratio between the styrene copolymer to the sum of the styrene and alkyl(meth)acrylate components was found to be critical to the light transmission of the inventive composition.

BACKGROUND OF THE INVENTION

Blends of thermoplastic resins are known and commercially available. A thermoplastic resin is often selected to enhance or supplement the properties of the other blend components (see, for instance, U.S. Pat. Nos. 4,317,890; 4,342,847 and 5,194,494). Commercial molding compositions containing TPU and ABS have long been available. The art is noted to include U.S. Pat. No. 4,251,642 which disclosed a blend of polyurethane with a block copolymer of styrene and certain conjugated diolefins and a graft copolymer of styrene, acrylonitrile and butadiene (ABS). Also relevant is U.S. Pat. No. 3,049,505 which disclosed a blend containing ABS and thermoplastic polyurethane (TPU) characterized in its improved tear strength. U.S. Pat. No. 5,614,589 disclosed a transparent composition containing methacrylate-acrylonitrile-butadiene-styrene (MABS), a specific TPU and a compatibilizer in the form of emulsion ABS. U.S. Pat. No. 5,216,062 disclosed a composition containing TPU, a grafted rubber (such as ABS or ASA) and a copolymer of alpha methyl styrene and (meth) acrylonitrile.

For many applications, it is desirable to have a transparent plastic composition. Transparency is particularly desirable for packaging materials, vessels, and containers to permit visual inspection of the contents. Transparency in the present context is understood as a property enabling light transmission (herein LT value) of at least 40% as measured according to ASTM D-1003. In order to achieve this level of transparency, one skilled in the art would select a transparent TPU and a transparent copolymer of styrene and acrylonitrile (SAN) that are (i) reasonably compatible to achieve a uniform dispersion and (ii) virtually identical in terms of their refractive indices. One skilled in the art would also know that identifying the SAN and TPU components meeting these criteria is not a trivial matter because TPU and SAN are generally incompatible. Moreover, the difference in their refractive indices render opaque blends of these components. This is to say that despite the transparency of the individual components, the resulting blend is typically opaque or the molded articles are opaque. To achieve and maintain the dispersion through processing to a final molded article, it is necessary to improve the interaction that results during the mixing process to limit phase separation. If the mixing is insufficient, the problem manifests itself in the form of opacity, non-uniform melt flow, and unreasonably large variations in physical properties.

Blends of thermoplastic polyurethanes with other thermoplastics suffer from various processing problems including non-uniformity of melt flow. To improve the processing of such blends, Carter (U.S. Pat. No. 4,179,479) disclosed adding a small amount of polymethyl methacrylate (PMMA). The PMMA appears to have promoted the dispersion, surface gloss and processing of the compositions containing TPU and ABS. Although Carter exemplifies clear pellets of compositions containing TPU and ABS, PMMA is added in relatively small amounts.

The preparation of blends of TPU with SAN have been attempted previously; these had unpredictable physical and optical properties. Zerjal, et al. (Structure-Property Relationships in Polyurethane-Poly(styrene-co-acrylonitrile) Blends), Journal of Applied Polymer Science, Volume 50, pp. 719–727, (1993) reported that the blending of TPU and SAN results in many property variations in the finished blend. Paul and Newman (Polymer Blends, Academic Press, New York, 1978, Volume 1) attributed this to the unmixing of TPU/SAN solutions over all composition ranges and concluded that these blends are immiscible. The challenge to create stable blends of SAN and TPU was to form a blend that remained mixed under a variety of processing/molding conditions and remains transparent. One skilled in the art could recognize that the miscibility of the SAN and TPU components is dependent on the composition of the individual components. Although individual compositions of SAN and TPU may be transparent under limited processing conditions, they rarely remain transparent without special processing. The present invention describes the use of an acrylate polymer, preferably PMMA, that acts as a compatibilizer for SAN and TPU to maintain transparency through the forming of the finished part.

DETAILED DESCRIPTION OF THE INVENTION

The thermoplastic molding composition of the invention is comprised of (a) a thermoplastic polyurethane component (b) a styrene copolymer, and (c) an alkyl(meth)acrylate component.

The thermoplastic polyurethane component is present in an amount of about 10 to 70, preferably 20 to 60 percent relative to total weight of components (a), (b) and (c). The total weight of components (b) and (c) is 30 to 90, preferably 40 to 80 percent relative to the total weight of components (a) (b) and (c). Further, the weight ratio of (b) to the sum of (b) and (c) is about 0.43 to 0.54.

The transparent thermoplastic polyurethane suitable in the preparation of the inventive composition is known in the art and is readily available in commerce. It is necessary that the TPU component of the inventive composition have transparency of no less than 40%.

Suitable thermoplastic polyurethanes useful in the invention are those prepared from a diisocyanate, a polyester or polyether and a chain extender. These thermoplastic polyurethanes are those which are substantially linear and maintain thermoplastic processing characteristics.

The thermoplastic polyurethanes may be synthesized by methods disclosed, e.g., in U.S. Pat. No. 3,214,411 incorporated herein by reference. A particularly useful polyester resin used as a starting material for the thermoplastic polyurethane are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02% preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol, up to about 1%, may be used along with the glycols such as, for example, trimethylolpropane, glycerin, hexanetriol and the like. The resulting hydroxyl polyester has a molecular weight of at least about 600, a hydroxyl number of about 25 to about 190 and preferably between about 40 to about 60, and an acid number of between about 0.5 and about 2 and a water content of 0.01 to about 0.2%.

The organic diisocyanate to be used in the preparation of the elastomer is preferably 4,4'-diphenylmethane diisocyanate. It is desired that the 4,4'-diphenylmethane diisocyanate contains less than 5% of 2,4'-diphenylmethane diisocyanate and less than 2% of the 2,2'-dimer of diphenylmethane diisocyanate. It is further desired that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic processable polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like. Any suitable chain extending agent having active hydrogen containing groups reactive with isocyanate groups may be used such as, for example, diols including ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxymethyl-cyclohexane), hexanediol, thiodiglycol and the like; diamines including ethylene diamine, propylene diamine, butylene diamine, hexamethylene diamine, cyclohexalene diamine, phenylene diamine, toluylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as, for example, glycerin, trimethylolpropane, hexanetriol, pentaerythritol and the like.

In accordance with the process of this invention, the polyester, the organic diisocyanate and the chain extender may be individually heated preferably to a temperature of from about 60° C. to about 135° C. and then the polyester and chain extender are substantially simultaneously mixed with the diisocyanate. In a preferred embodiment, the chain extender and the polyester each of which has been previously heated, are first mixed and the resulting mixture is mixed with heated diisocyanate. This method is preferred for the reason that the extender and the polyester will not react prior to the introduction of the diisocyanate and rapid mixing with the diisocyanate is thus facilitated. The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to about 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516, 2,621,166 and 2,729,618. The reaction mixture, after complete mixing, is conducted onto a suitable heated surface or poured onto a table or conveyor and preferably maintained at a temperature of from about 60° C. to about 135° C., until it solidifies, e.g., into a slab so that it is still a thermoplastic and can be easily removed and reduced to the desired particle size. To facilitate the ready removal of the material from the hot plate, the table, conveyor or other surface, the slab or other physical form may be cut or scored while it is still soft to permit removal in a number of pieces rather than as a unit. This cutting or scoring is best done while the reaction mixture is still soft, for when the material hardens it becomes difficult to cut, although it can still be readily reduced in size by grinders, choppers and other equipment known in the industry.

After the reaction mixture has reacted to form a hard product which is suitable for cutting, chopping or grinding, it is cooled to room temperature. This material may then be either stored for several weeks, if desired, or it may be immediately further processed after blending with the polyacrylate processing aid and if desired, the other thermoplastic material, by extrusion, compression molding, injection molding or other similar techniques known in the industry.

Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166, 2,729,618, 3,214,411, 2,778,810, 3,012,992, Canadian Patents 754,233, 733,577 and 842,325 all incorporated herein by reference may be used to produce the thermoplastic polyurethanes composition herein.

Among the thermoplastic polyurethane elastomers commercially available for use in the thermoplastic material of this invention are the Texin elastoplastics of Bayer Corporation. These thermoplastic polyurethanes characteristically contain the urethane structure represented by the following formula:

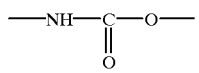

Most preferably, the polyurethanes useful in the present invention have shore hardnesses (ASTM D-2240) between about 70 on the "A" scale and 60 on the "D" scale.

Physical properties of various grades of polyurethanes are found in Saunders and Frisch, *Polyurethanes, Chemistry and Technology*, Interscience Publishers, Part II Technology, p. 383, Table XLVI; and in An Engineering Handbook of TEXIN *Urethane Elastoplastic Materials*, Bayer Corporation, Pittsburgh, Pa.

The styrene copolymer of the invention is a copolymer of at least one first monomer selected from the group consisting of styrene, alpha methyl styrene and ring-substituted styrene and at least one second monomer selected from the group consisting of acrylonitrile and methacrylonitrile, wherein weight ratio of first to second monomers is about 83/17 to about 72/28, more preferably about 77/23 to 75/25 and where the copolymer has a weight average molecular weight of 50,000 to about 200,000 preferably 100,000 to about 180,000. While additional monomers may be included in the polymerized copolymer, it is required that at least 70% weight percent of the structural units be of the first and second monomers. The suitable styrene copolymer is further characterized in that its LT value is at least 40%.

The alkyl(meth)acrylate component is a compound, polymeric or oligomeric, the molecular structure of which contains units derived from alkyl(meth)acrylate, the component having a melt flow rate of at least 7, preferably 10 to about 30, as measured in accordance with ASTM D-1238 Condition I. While additional units may be included in the structure of the component, it is required that at least 70% weight percent of the structural units be derived from alkyl(meth)acrylate. The suitable alkyl(meth)-acrylate component is further characterized in that its LT value is at least 40%.

The preferred alkyl(meth)acrylate component is poly (methyl methacrylate) or PMMA which is a commercial plastic material available in the form of molding powder or pellets from several producers. It can be produced, for instance, by polymerizing methyl methacrylate monomer in water and ethanol solution in the presence of hydrogen peroxide initiator. Additional information relative to PMMA is included in *Encyclopedia of Polymer Science and Technology* (Vol.1 pp. 247 and 289, et seq.)

The compositions of the invention may be made by conventional methods which are well known to the art-skilled. These include drying the components followed by blending in the melt. If any of the components are solid, they are preferably ground before mixing. The blended material can be utilized directly or they may be extruded and pelletized to form pellets that are readily fabricated by any suitable thermoplastic technique.

The invention is further illustrated but not limited by the following examples in which parts are by weight unless otherwise specified.

EXAMPLES

The following materials were used in carrying out the examples reported below:

SAN-I: styrene-acrylonitrile copolymer containing 23% acrylonitrile and 77% styrene, having a weight average molecular weight of 163,000 and a number average molecular weight of 72,000 and transparency of about 95%.

TPU-I: thermoplastic polyurethane derived from a $C_4$-polyether, MDI, and 1,4-butanediol, having a Shore hardness of 86 and transparency of about 90%.

PMMA: poly(methylmethacrylate) from Atohaas Americas, Inc., having a melt flow rate (ASTM D-1238 g/10 min., Condition I) of 14.5; Refractive Index (ASTM D-542) of 1.49; specific gravity (ASTM D-792) of 1.18 and Light Transmission ASTM D-1003 Total White Light of 92.

The materials were dried, melt blended and strand pelletized in a Brabender measuring head. The resulting product was then injection molded into a plaque having the following dimensions: 3×4×0.100". The product was molded at a nominal stock temperature of 424° F. with mold temperature at 130° F., injection rate of 1.0 inch/second and molding cycle of 100 seconds. Light transmission was measured by method ASTM D-1003. Compositions having transmission greater than or equal to 40% were rated transparent; below 40% were rated opaque.

TABLE I

| EXAMPLE | SAN-I | TPU-I | PMMA | SAN/(PMMA + SAN) | Light Transm. | Result |
|---|---|---|---|---|---|---|
| 1(comp.) | 15 | 30 | 55 | .21 | 1 | Opaque |
| 2 | 15 | 70 | 15 | .50 | 88 | Transparent |
| 3(comp.) | 20 | 30 | 50 | .29 | 8 | Opaque |
| 4 | 23 | 54 | 23 | .50 | 89 | Transparent |
| 5(comp.) | 25 | 30 | 45 | .36 | 12 | Opaque |
| 6 | 30 | 30 | 40 | .43 | 45 | Transparent |
| 7 | 30 | 40 | 30 | .50 | 88 | Transparent |
| 8 | 33 | 30 | 38 | .46 | 65 | Transparent |
| 9 | 34 | 30 | 36 | .49 | 90 | Transparent |
| 10 | 35 | 30 | 35 | .50 | 84 | Transparent |
| 11 | 36 | 30 | 34 | .51 | 74 | Transparent |
| 12 | 38 | 30 | 33 | .54 | 52 | Transparent |
| 13(comp.) | 40 | 30 | 30 | .57 | 10 | Opaque |
| 14 | 45 | 10 | 45 | .50 | 88 | Transparent |

TABLE I-continued

| EXAMPLE | SAN-I | TPU-I | PMMA | SAN/(PMMA + SAN) | Light Transm. | Result |
|---|---|---|---|---|---|---|
| 15(comp.) | 45 | 30 | 25 | .64 | 6 | Opaque |
| 16(comp.) | 50 | 30 | 20 | .71 | 5 | Opaque |
| 17(comp.) | 55 | 30 | 15 | .79 | 5 | Opaque |

*Comp. denotes comparative example

The invention resides in the finding that the ratio of component (b) to the sum of components (b) and (c) (represented in the table above as "SAN/(PMMA+SAN)"), is a critical factor in determining the transparency of the inventive composition.

For attaining transparency, it is required that the ratio be at least 0.43 and no greater than 0.54. Compositions where the ratio has values outside this range were found to be opaque or falling short of transparency as defined above.

In the preferred embodiments (Examples 2, 4, 7, 9, 10, and 14), the light transmission was greater than or equal to 80%. Examples 8 and 12, which represent a less preferred embodiment, the light transmission was less than 80% but greater than or equal to 50%. The least preferred embodiment is demonstrated in Example 6, which has a light transmission value greater than or equal to 40% but less than 50%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition having a light transmission value of at least 40% comprising (a) a thermoplastic polyurethane resin having a light transmission value of at least 40%, (b) a styrene copolymer having a weight average molecular weight of 50,000 to 200,000 of at least one first monomer selected from the group consisting of styrene, alpha methyl styrene and ring-substituted styrene and at least one second monomer selected from the group consisting of acrylonitrile and methacrylonitrile, said copolymer resin having a light transmission value of at least 40% and (c) an alkyl(meth)acrylate component having a melt flow rate of at least 7 measured in accordance with ASTM D-1238 Condition I, and light transmission value of at least 40%, wherein said (a) is present in an amount of 10 to 70 percent and the combined weight of (b) and (c) is 30 to 90 percent, said percent is relative to the total of (a), (b) and (c), and where the weight ratio of (b) to the sum of (b) and (c) is about 0.43 to 0.54.

2. The molding composition of claim 1 wherein said weight ratio of first to second monomers is about 83/17 to about 72/28.

3. The molding composition of claim 1 wherein said weight ratio of first to second monomers is about 77/23 to 75/25.

4. The molding composition of claim 1 wherein the copolymer has a weight average molecular weight of 100,000 to about 180,000.

5. The molding composition of claim 1 wherein said melt flow is 10 to 30.

6. The molding composition of claim 1 wherein said thermo-plastic polyurethane resin is characterized in that its shore hardness value is between about 70 on the "A" scale and 60 of the "D" scale.

7. The molding composition of claim 1 wherein said thermoplastic polyurethane resin is derived from a $C_4$-polyether, MDI, and 1,4-butanediol.

8. The molding composition of claim 1 wherein said alkyl(meth)acrylate component is poly(methyl methacrylate).

9. The molding composition of claim 1 wherein said (a) is present in an amount of 20 to 60 percent and the combined weight of (b) and (c) is 40 to 80 percent.

10. A thermoplastic molding composition having a light transmission value of at least 40% comprising (a) a thermoplastic polyurethane resin having a light transmission value of at least 40%, derived from a $C_4$-polyether, MDI, and 1,4-butanediol, having a Shore A hardness of 86 and transparency of about 90%, (b) a styrene-acrylonitrile copolymer containing 23% acrylonitrile and 77% styrene, having a weight average molecular weight of 163,000 and a number average molecular weight of 72,000 and transparency of about 95%, and (c) poly(methylmethacrylate) having a melt flow rate of 14.5 and light transmission of 92 wherein said (a) is present in an amount of 10 to 70 percent and the combined weight of (b) and (c) is 30 to 90 percent, said percent relative to the total of (a), (b) and (c), and where the weight ratio of (b) to the sum of (b) and (c) is about 0.43 to 0.54.

* * * * *